United States Patent [19]

Brotz

[11] Patent Number: 4,882,681

[45] Date of Patent: Nov. 21, 1989

[54] REMOTE LANGUAGE TRANSLATING DEVICE

[76] Inventor: Gregory R. Brotz, P.O. Box 1322, Sheboygan, Wis. 53081

[21] Appl. No.: 92,373

[22] Filed: Sep. 2, 1987

[51] Int. Cl.⁴ ............................................. G06F 15/38
[52] U.S. Cl. ................................ 364/419; 340/825.76
[58] Field of Search .................. 364/419; 340/825.7 C

[56] References Cited

U.S. PATENT DOCUMENTS

| | | | |
|---|---|---|---|
| 4,211,998 | 7/1980 | Junginger et al. | 340/825 X |
| 4,231,019 | 10/1980 | Junginger et al. | 340/825.76 |
| 4,489,396 | 12/1984 | Hashimoto et al. | 364/900 |
| 4,658,374 | 8/1987 | Tanimoto et al. | 364/219 |
| 4,677,552 | 6/1987 | Sibley, Jr. | 364/219 |

Primary Examiner—A. D. Pellinen
Assistant Examiner—Jeffrey A. Gaffin
Attorney, Agent, or Firm—William Nitkin

[57] ABSTRACT

A method for simultaneous translation of conversation between a user of the system of this invention and another party wherein the user has a transmitter/receiver and can broadcast language to be translated to a remote translation computer and the translation of such language to another language is done by such computer and broadcasts the translation back to the user so that the user and the other party can hear the translation of what the other has said in his own language.

4 Claims, 2 Drawing Sheets

REMOTE LANGUAGE TRANSLATING DEVICE

BACKGROUND OF THE INVENTION

1. Field of the Invention

The device of this invention relates to a system of electronic translation of spoken language and more particularly relates to a portable system whereby a user can have verbal statements translated from one language to another at the location of the user.

2. Description of the Prior Art

At present there are language translation computers which have been developed to translate an inputted language into another language which is outputted usually to a computer screen or printer. These systems are relatively new and can be utilized to translate entire sentences. Such systems are known in the prior art such as disclosed in U.S. Pat. No. 4,654,798 to Taki et al for a System of Simultaneous Translation into a Plurality of Languages with Sentence-forming Capabilities. In these systems the desired sentence to be translated from one language is inputted into the computer and the system processes it and then outputs the sentence translated in the desired language. These systems, though, are usually office bound and need computers of large size to run the programming. The programs apply a combination of syntactics and semantics to decipher and translate the foreign language. The programs analyze foreign language on a sentence-by-sentence basis. For each sentence the program searches its internal dictionary, checking each word and identifying the verb by the process of elimination. After identifying the verb, the program identifies the subject and any modifiers. After dissecting the sentence word by word, the program determines the meaning of the sentence as a whole by sensing how words interact to affect the sentence's meaning. It accomplishes this by comparing the order of the words in the sentence with what is stored in the computer regarding various word-combinations having distinct meanings. Such computers can generate translations in a number of different languages. Another recent patent is U.S. Pat. No. 4,641,264 to Nitta et al for a Method of Automatic Translation between Natural Languages. This patent discloses a further system for the translation of entire sentences. Speech recognition systems to input spoken words into a computer also exist such as U.S. Pat. No. 4,363,102 to Holmgren et al which discloses a speaker recognition system. These types of systems will recognize spoken words and input a signal representing that spoken word into a language translation system when put together therewith as described below.

SUMMARY OF THE INVENTION

It is an object of this invention to combine a speech recognition system with a language translation system and have such combined system be accessible to users located away from the large computers necessary for such systems by means of portable transmitting/receiving units. For example, if an English-speaking person were in France and wished to communicate with a French-speaking person, a computer system could be set up both for receipt of spoken English for translation into spoken French and for receipt of spoken French for translation into spoken English. The English-speaking user would speak into the transmitter/receiver the sentence which he wished to have translated into French, for example, "How much is a pound of butter?" This sentence would be transmitted to a distant central computer having a speech recognition and language translation system which would receive, translate and broadcast the translated sentence back through the transmitter/receiver to the French-speaking person. Further, when the French-speaking user would answer in French, "Le beurre est 14 francs," he would speak into the transmitter/receiver which sentence would be transmitted to the distant speech translation computer then set to receive a French spoken sentence and it would translate the spoken French into English and then transmit and broadcast the translated message in English back to the English-speaking user who would hear from the transmitter/receiver, "The butter is 14 francs." A cellular telephone system can be used as a transmitter/receiver to transmit directly if close enough to a cell-receiving antenna which will carry the signal to the computer center containing the translation computer. If a user were located a great distance away from the translation computer, a cellular telephone could transmit the sentence to a nearby automobile having a signal amplifier to broadcast the signal through telephone lines or repeater towers which would eventually carry the message to the cell-receiving antenna which would carry the signal to and from the distant translation computer which would translate the sentence received and then transmit the translated sentence back in verbal form either through a speech synthesizer located at the translator computer or in the cellular telephone to translate the computer output into speech at the point of the conversation.

DESCRIPTION OF THE PREFERRED EMBODIMENT(S)

Figure 1:
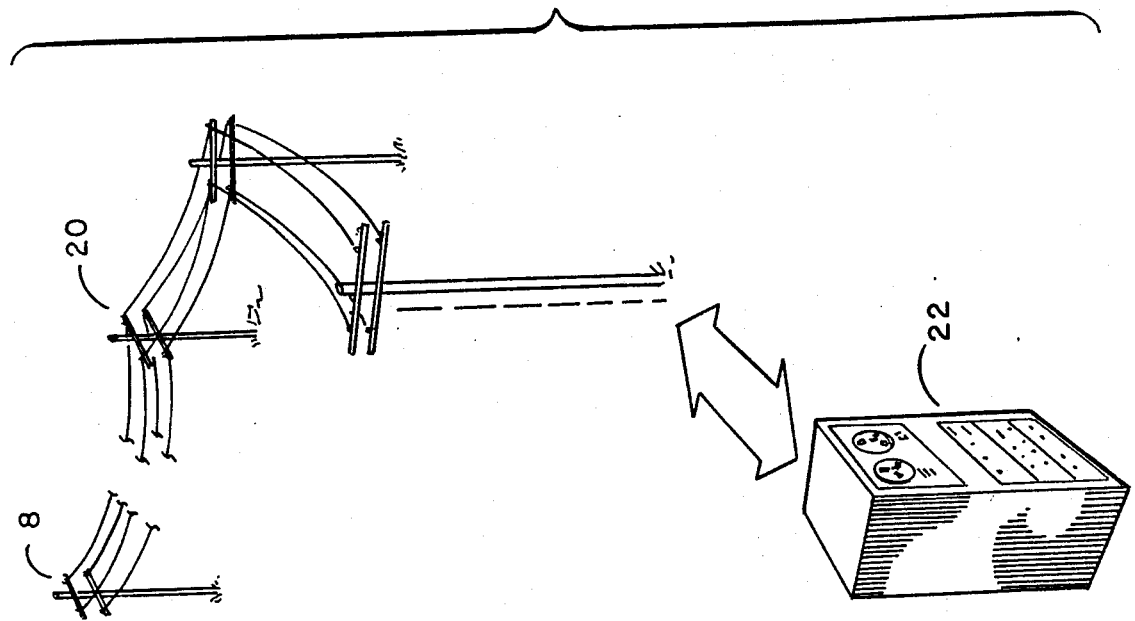
FIG. 1 illustrates two users of the system of this invention using a cellular telephone transmitter with a booster and telephone to carry signal to the central language translation computer.
Figure 1:
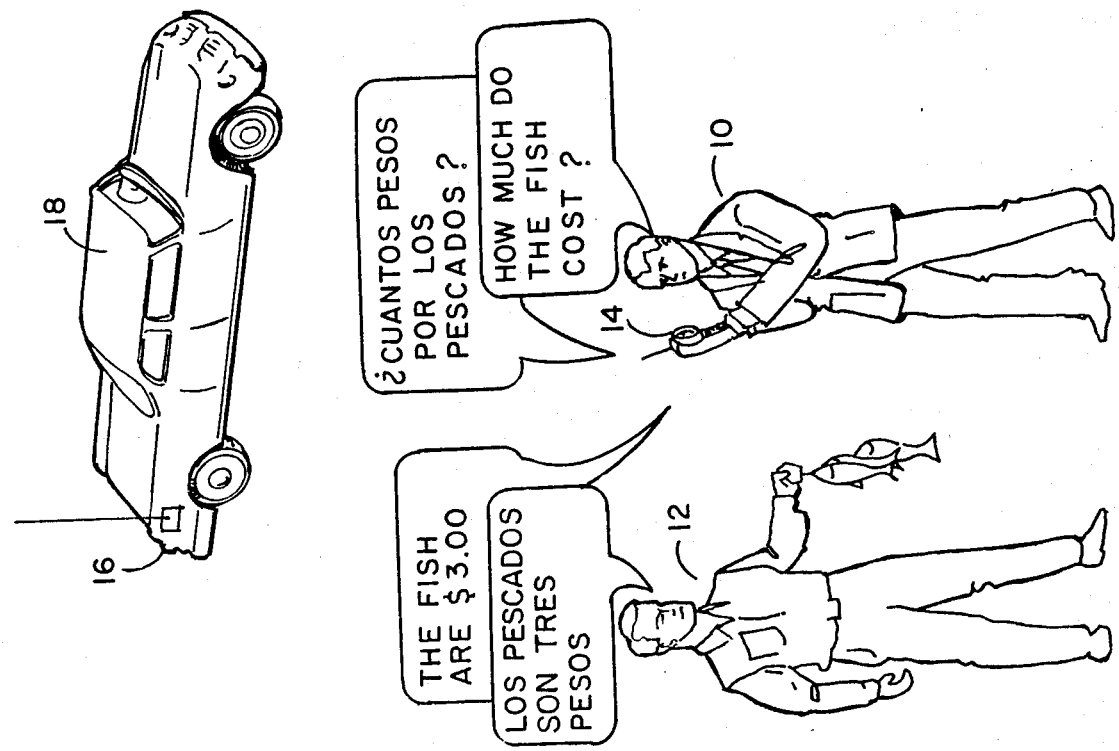

FIG. 1 illustrates the broad structure of the system of this invention showing first user 10 holding cellular telephone 14 or other equivalent radio frequency transmitter/receiver device and also shows an example of actual speech being translated in a commercial transaction. First user 10 speaks into cellular telephone 14 in his own language such as English and that sentence is transmitted either to booster unit 16 in automobile 18 to be transmitted to telephone lines 18 or 20, cell-receiving center, repeater towers or even satellite transmittors which will carry the signal quickly over long distances to language translation computer 22 which is of the type described in the Description of the Prior Art or equivalent adapted to receive input through a speech recognition system and to translate that speech into a selected second language. The computer then immediately processes the sentence and translates it from the first user's language to the second user's language and then transmits the translated sentence back through the repeater towers or telephone lines 18 and 20 and booster unit 16 to cellular telephone 14 where the information is then broadcast to second user 12 in the language understood by that person. This message is then listened to by second user 12 who could then respond by speaking into cellular telephone 14 in his own language, such response to be transmitted in the same way to the language translator computer system 22 and his response would come back in a similar manner translated into the language understood by first user 10. In this way individuals who do not speak the same language can communicate quickly and easily.

The system of this invention would assist commercial transactions between individuals speaking different languages. Use of the system of this invention would also encourage better understanding between people speaking different languages and would enable conversations to take place at remote locations without the need for third party interpretors.

Figure 2:
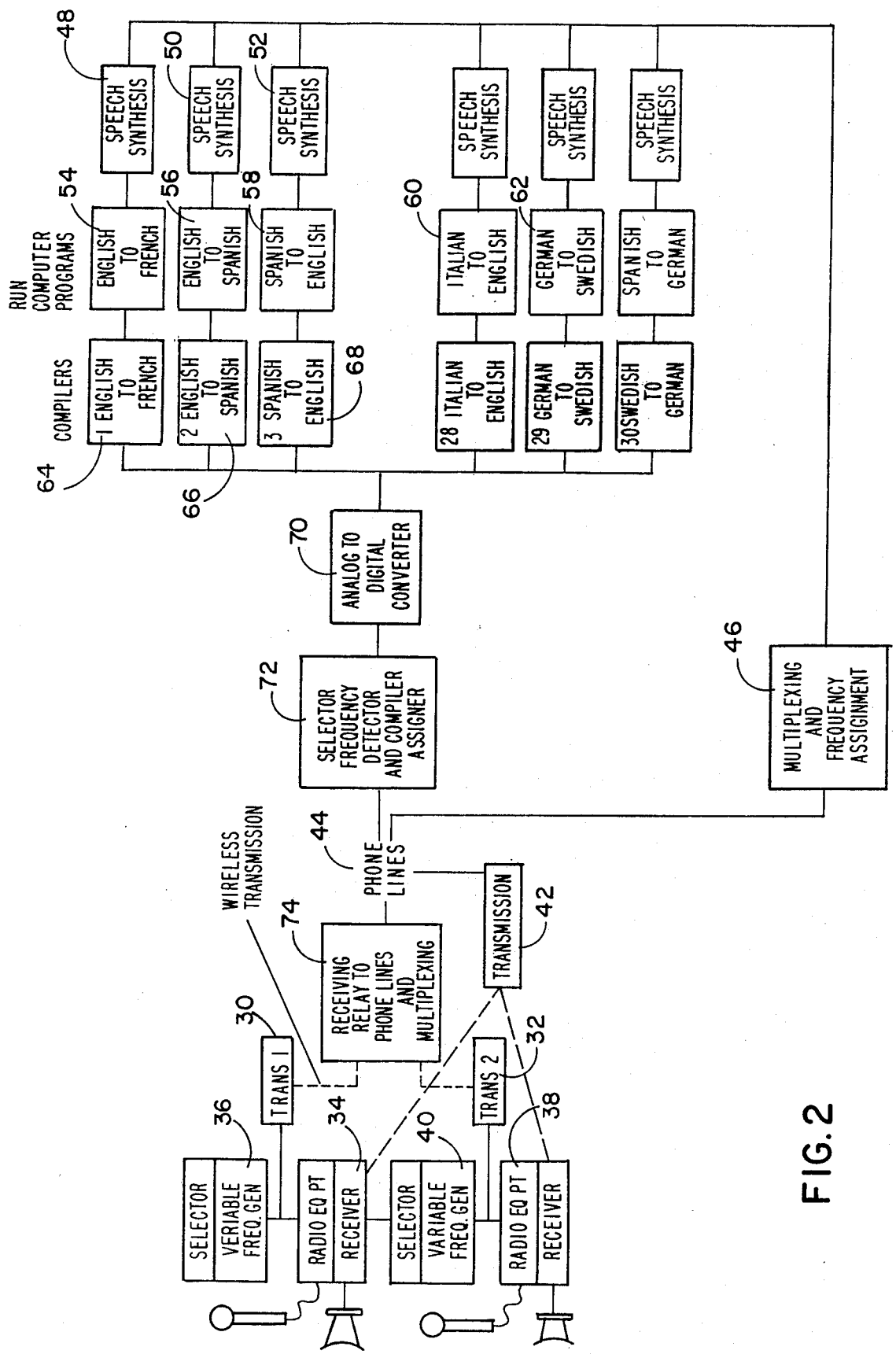
FIG. 2 illustrates an expanded multi-language system using a frequency selector to assign the language for translation.

FIG. 2 illustrates a more complex system for multiple language translation capability within the system of this invention. Seen in this view is a pair of transmitter/receivers which could be used by different users at different locations. Each transmitter/receiver can operate at a different specific distinct frequency recognized by the system. It should be noted though that only one of these transmitter/receivers is needed per person to translate both the foreign language and the user's language back and forth as described below. For example, an individual would carry first transmitter/receiver 30 which can include a cellular telephone or other type of radio equipment 34 with a receiver as part thereof. The transmitter/receiver can also have a language determination frequency generator with a selector switch to assign one of a plurality of such selector frequencies which is generated within the transmitter/receiver to be transmitted with the voice signal. These signals can be transmitted by wireless transmission to a receiving relay 74 which can be at a cell-receiving center and will convert the radio waves into telephone line impulses to be interconnected to telephone lines or other signal transmission means such as microwave transmission. These signals can be multiplexed to allow many of such transmissions simultaneously over the same line. The signal is carried by the signal transmission means to a language computer system. A selector frequency detector and compiler 72 detects the selector frequency chosen by the user of transmitter/receiver 30 and directs the analog voice signal to the compiler indicated by the selector frequency signal. The user would, for example, select the designated selector frequency for the transmission of English to be translated into Spanish. When the user receives back the Spanish translation which is broadcast to be heard by the person with whom the user is speaking and that other person then speaks Spanish, the user would change frequency selector 36 to the Spanish-to-English selector frequency which would then broadcast that selector frequency along with the voice signal to activate Spanish-to-English compiler 68. The analog voice signal that comes in must first be converted from such an analog voice signal to a digital signal that will be understood by the computer which conversion is accomplished in a speech recognition device such as analog-to-digital converter 70 which changes the continuously varying analog signal to discrete digital signals, and the selector frequency then directs the digitized voice signal to the proper compiler such as English-to-Spanish compiler 66 or with another selector frequency signal to the Spanish-to-English compiler 68. There could be a great many compilers available, for example, compiler 68 is from Italian-to-English or compiler 69, from German-to-Swedish and the like. These compilers then cause the appropriate computer program to run, for example, the English-to-Spanish program 56, translating the inputted sentence. The compilers also act as holding memories when more than one transmitter/receiver is used at one time so that the information is converted to machine language and ready to run in the computers which system helps assure the most efficient use of the more time-consuming translation programs and helps provide a nearly instantaneous translation response to the user. The computer then outputs to speech synthesis unit 50 which includes a signal generator directed by its program which first changes the text output from the translation program to phonemes, a phonetic representation of words, and then generates codes that can be turned into an audio signal which output is then directed back to transmitter/receiver 30 through a multiplexing and frequency assignment unit 46 to direct simultaneous transmissions of more than one signal over a single line and to direct the appropriate signal to the proper transmitter/receiver. The signal is transmitted through telephone lines 44 or equivalent signal transmission means such as microwave transmission to transmitter/receiver 30 through transmitter 42 which broadcasts each signal on the particular frequency of the transmitter/receiver to receive that signal. Of course, many transmitter/receivers could be used such as transmitter/receiver 32 which could utilize the same system on a time-sharing basis which timesharing or multiplexing is well known in the art so that the central language computer would be able to translate many conversations from many languages to other languages, each as selected by the individual transmitter/receiver's variable selector frequency generator 36 which selector frequency signal would direct the computer as to what language it was receiving and into what language it should translate. Many different units could be utilized at the same time to structure a large scale translation operation and have each remote transmitter/receiver usable by individuals to translate a variety of languages that they might encounter in their travels through various geographical areas. The variable frequency generator selector can be a switch on the transmitter/receiver unit, and can be embodied in a button that must be depressed while the user is talking and also while the other party is talking, which causes the selector frequency signal of indication of language of translation to be broadcast while the voice signal is being received. When the speech input has been completed, the user can release the button. Such signal will give the computer information as to when to start processing what words have been stored in the compiler so that it will receive the complete sentence, and it will also help the user to speak in a full and complete sentence structure so that that sentence can be properly translated into a meaningful translation by the computer because the user will be conscious of depressing the frequency selector button and will formulate his or her speech in clear sentence format.

The system of this invention can also be tied directly into telephone lines so that parties to a conversation where each speaks a different language can have his speech translated to the other party.

Although the present invention has been described with reference to particular embodiments, it will be apparent to those skilled in the art that variations and modifications can be substituted therefor without departing from the principles and spirit of the invention.

I claim:

1. A method for contemporaneous language translation at the site of the user and another party comprising the steps of:

provulating the user with a transmitter/receiver device;

transmitting a convectional segment of the user's speech by a voice signal through said transmitter/receiver to a speech translation computer;

translating the user's speech into a selected other spoken language form of the other party by said speech translation computer;

broadcasting said translated speech;

receiving back the translated speech by said transmitter/receiver;

broadcasting in verbal form said translated speech to the other party for that other party to comprehend the translation of what the user had originally spoken in a different language;

said transmitter/receiver receiving a conversational segment of the speech of the other party in the other party's foreign language;

transmitting said foreign language over said transmitter/receiver to said speech translation computer;

translating the other party's speech into the user's language;

receiving back of said transmitter/receiver the translation of the other party's foreign language; and broadcasting in verbal form said translated foreign language to the user whereby the user can listen to the translation and carry on conversations with instantaneous translations at the site of the user and any other party.

2. The method of claim 1 further including the step of:

generating a selector frequency signal to be carried with said voice signal, such selected frequency to designate to said computer the language received and the language to which the received language is to be translated.

3. The method of claim 2 further including the step of:

providing a plurality of transmitter/receiver each with a different operating frequency.

4. The method of claim 3 wherein said user and other party are at different locations further including the step of:

providing a telephone linkage between the user and said other party; and receiving and broadcasting the speech of said user and said other party over such telephone line.

* * * * *